United States Patent
Rothschild et al.

(10) Patent No.: US 11,271,807 B1
(45) Date of Patent: Mar. 8, 2022

(54) AUTOMATED INSTALLATION AND CONFIGURATION OF VIRTUAL PREMISED SERVERS

(71) Applicant: Cox Communications, Inc., Atlanta, GA (US)

(72) Inventors: Keith Alan Rothschild, Dunwoody, GA (US); Dipan Patel, Atlanta, GA (US); Ron Lev, Atlanta, GA (US); Steve Malenfant, Cumming, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 67 days.

(21) Appl. No.: 16/353,729

(22) Filed: Mar. 14, 2019

(51) Int. Cl.

| | |
|---|---|
| *H04L 29/06* | (2006.01) |
| *H04L 41/0806* | (2022.01) |
| *H04L 41/08* | (2022.01) |
| *H04L 12/46* | (2006.01) |
| *H04L 41/5054* | (2022.01) |
| *H04L 41/12* | (2022.01) |

(52) U.S. Cl.
CPC ...... *H04L 41/0806* (2013.01); *H04L 12/4633* (2013.01); *H04L 41/0886* (2013.01); *H04L 41/12* (2013.01); *H04L 41/5054* (2013.01)

(58) Field of Classification Search
CPC ............ H04L 41/0806; H04L 12/4633; H04L 41/0886; H04L 41/12; H04L 41/5054
USPC ........................................................ 709/222
See application file for complete search history.

(56) References Cited

U.S. PATENT DOCUMENTS

| | | | | |
|---|---|---|---|---|
| 9,742,807 | B2* | 8/2017 | de los Reyes | H04L 63/1441 |
| 10,498,611 | B1* | 12/2019 | Kloberdans | H04L 41/5054 |
| 2008/0069121 | A1* | 3/2008 | Adamson | H04L 12/2803 370/401 |
| 2012/0166538 | A1* | 6/2012 | Son | H04L 12/2809 709/204 |
| 2014/0136952 | A1* | 5/2014 | Zhu | G06F 16/9574 715/234 |
| 2014/0172947 | A1* | 6/2014 | Ghai | H04L 61/2061 709/202 |
| 2014/0280736 | A1* | 9/2014 | Park | H04L 67/16 709/217 |

(Continued)

OTHER PUBLICATIONS

Oleksiy Mazhelis, A Framework for Evaluating Internet-of-Things Platforms: Application Provider Viewpoint, 2014, IEEE World Forum on Internet of Things (Year: 2014).*

*Primary Examiner* — Schquita D Goodwin
(74) *Attorney, Agent, or Firm* — Merchant & Gould

(57) ABSTRACT

Automated virtual premised server installation and services configuration are provided. Aspects provide a system, method, and computer readable storage device that enable aspects of a virtual premised server-on-demand (VPSoD) service to provide a technical improvement to premised server installation, support, and operation. The VPSoD service provides the capability of a consumer to subscribe to one or more premised server servers, and those servers and associated services are automatically installed on a remote virtual instance of a premised server and automatically configured with minimal user input. A secure communication tunnel is configured between the consumer's local network and the virtual premised server for enabling services installed on the virtual premised server to communicate on the local network and behave as if the virtual premised server is connect into the network.

20 Claims, 9 Drawing Sheets

(56) References Cited

U.S. PATENT DOCUMENTS

| | | | |
|---|---|---|---|
| 2015/0195099 A1* | 7/2015 | Imes | H04L 12/2803 700/275 |
| 2016/0006672 A1* | 1/2016 | Saavedra | H04L 47/828 370/401 |
| 2016/0006696 A1* | 1/2016 | Donley | H04L 63/0236 709/223 |
| 2016/0132214 A1* | 5/2016 | Koushik | G06F 9/455 715/741 |
| 2016/0241509 A1* | 8/2016 | Akcin | H04L 67/10 |
| 2016/0337206 A1* | 11/2016 | Bugenhagen | H04L 67/34 |
| 2017/0034274 A1* | 2/2017 | Hanney | H04L 67/1097 |
| 2017/0339065 A1* | 11/2017 | Li | H04L 41/0893 |
| 2019/0138554 A1* | 5/2019 | Remis | G06F 16/903 |
| 2020/0028744 A1* | 1/2020 | Rice | H04L 41/0806 |

\* cited by examiner

AUTOMATED INSTALLATION AND CONFIGURATION OF VIRTUAL PREMISED SERVERS

BACKGROUND

Incorporating a home server into a local (home) network can provide a variety of benefits, such as an example benefit of providing additional/redundant storage of and access to software and content (e.g., games, videos, music, photos, books, documents). Additionally, a home server can run various services, such as email, home automation, security monitoring, web serving, online gaming, printing, etc. For example, employing a home server to store data or to run services provides an advantage of offloading storage or computation tasks from a personal computer or other devices onto the server, thus freeing up memory and processing resources of the personal computer or the other devices.

While home servers can be useful and advantageous, installation of such servers and configuration of the servers to support various services or functionalities can be prohibitively difficult for an average consumer to perform. That is, premised server setup and services configuration can be a tedious and complicated process comprising various manual steps, and can be particularly problematic for average users who may not be technologically-adept or have knowledge of or previous experience with home server setups. For example, an average non-technical user may not be familiar with various computing technology terminology or components, and may not know what type of system may fulfill the user's server needs and/or may have difficulties understanding and following setup instructions. This complicated and time-consuming manual setup process is a disadvantage of home server usage, and may prevent many average users, and even many technical users, from installing and using home servers.

Another current disadvantage of home server usage is the requirement for a physical computing resource. That is, aspects of purchasing, housing, running, and maintaining a physical computing device configured as a home server may disincentivize using a home server. In addition to the cost to purchase and maintain, a physical home server consumes power at the premises where the device is located; and typically, a physical home server runs continuously. This power consumption and hardware deterioration due to use can be another factor that dissuades from installing and using home servers.

SUMMARY

Aspects of the present disclosure include a virtual premised server on-demand system configured to provide automated virtual premised server installation and services configuration. The term "premised server" is herein used to describe a computing server for a residence or other type of premises that provides services to other devices inside or outside the premises through a local network, the Internet or other network. A system, method, and computer readable storage device are described herein that provide a technical improvement to the setup and configuration of a premised server and associated services in part by instantiating a virtualized instance of a premised server on a network resource in support of one or more selected services and by configuring a communication tunnel via which the virtual premised server is enabled to communicate on a local network for discovering devices connected to the local network and for providing service functionalities to connected devices. In various implementations, the network resource is a computing resource in an edge network connected to or proximate to the local network.

Aspects of the virtual premised server on-demand system include a user interface (UI) comprising a listing of supported premised server services for display on a computing device. For example, the listing of services can include a listing of third-party services or functionalities that a user may typically utilize a home server to support (e.g., email, home automation, security monitoring, web serving, online gaming, printing). In response to receiving a user-selection of a supported service or services from the listing, network resources in a network proximate to the user's premises are allocated to an instantiation of a virtual premised server, and the virtual premised server is configured to perform functionalities of the selected service(s). For example, the virtual premised server is automatically set up and the selected service(s) are automatically installed and configured on-demand, thus reducing or eliminating the manual server and service setup and installation steps and processes required without aspects of the present disclosure. Additionally, aspects use a tunneling protocol to establish a secure and dedicated communication tunnel between the virtual premised server and a local network for enabling the virtual premised server to communicate with other devices connected to the local network and behave as if it is on the same network with the other devices.

In various implementations, aspects of the virtual premised server on-demand system are configured to scan the local network for devices connected to the network that may be compatible with the installed service(s) or available supported services. Compatible devices may be included in a listing and displayed in a UI. In response to a selection of a listed device, the device may be registered with the virtual premised server, and a driver associated with the selected device may be installed for enabling the virtual premised server to communicate with the selected device.

According to an example, the supported premised server services may be associated with a service offered by a service provider that enables users to offload resource requirements associated with a local premised server onto a virtual premised server operating on and consuming computing and memory resources of the service provider's (or other) network resources (e.g., rather than consuming computing and memory resources of a local server computer). Thus, aspects provide for a reduction of client hardware and software resources. For example, instead of a requiring a physical server computer, aspects enable a virtual premised server to be deployed on-demand in the cloud to host requested service or services. Accordingly, a local physical server computer is not required, nor are the setup or maintenance associated with a local physical server computer. In various implementations, the virtual premised server and/or services configured to run on the virtual premised server are offered to users for a fee or as part of a subscription. A user may use aspects of the virtual premised server on-demand system to take advantage of the benefits of a premised (home) server without the disadvantages associated with purchasing and maintaining a local computing resource or with the time-consuming and complicated manual setup and configuration of a local server and services.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views.

DETAILED DESCRIPTION

Aspects of the present disclosure provide a system, method, and computer readable storage device that enable aspects of a virtual premised server-on-demand (VPSoD) service for providing a technical improvement to premised server installation, support, and operation. As used herein, the term "VPSoD service" is defined as a service that provides the capability of a consumer to subscribe to one or more premised server servers, and those servers and associated services are automatically installed on demand on a remote virtual instance of a premised server and automatically configured to communicate on the consumer's local network via a secure communication tunnel. Thereafter, any server and service that is installed on the virtual premised server can be accessed and utilized by devices connected to the consumer's local network.

Consider as an example, a user owns a 3D printer, and wants to be able to control and view the 3D printer from a web browser and to print 3D objects remotely. The user does not have a home server machine and does not want to purchase or install one. The user's Internet service provider offers a VPSoD service. The user is enabled to access the VPSoD service via a web interface, where he/she is able to select 3D printer host software that meets his/her needs and specify or let the service recommend a host system for the software. The user can use the web interface to subscribe to the VPSoD service, wherein a virtual instance of a home (premised) server is created on an edge network resource and is automatically set up and configured with minimal input from the user. The user can then use the 3D printer host software to control and view the 3D printer from a web browser and to print 3D objects remotely. The user may use the web interface to select and add additional services to the virtual server for immediate use.

Figure 1A:
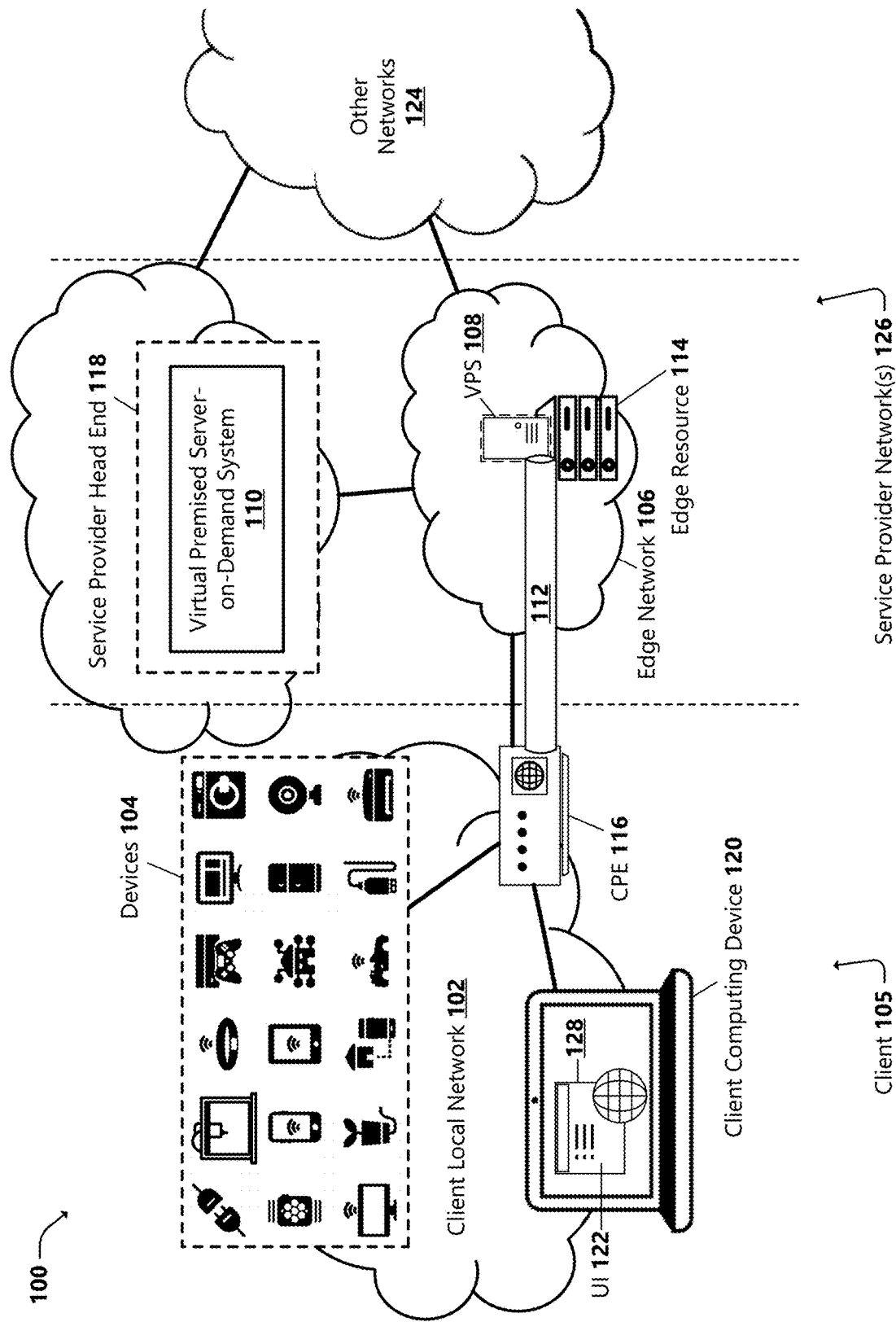
FIG. 1A is a block diagram of an example operating environment including a virtual premised server on-demand system for providing automated premised server installation and support in accordance with an embodiment.

FIG. 1A is a block diagram of an example operating environment 100 in which aspects of a VPSoD system 110 can be implemented for providing VPSoD services to clients 105. According to an aspect, one or more components of the VPSoD system 110 may be implemented as a hardware device or as software running on a computing system and connected to a service provider network 126. In various examples, the service provider network 126 is illustrative of a cable operator Internet Protocol (IP) network that is configured to provide clients 105 with access to the Internet and other networks 124. As should be appreciated, the service provider network can be implemented using comparable components and protocols in other broadband systems, such as DSL, wireless, other Internet service provider transports, such as analog and digital dial-up and private line environments. In some examples, the service provider may be a provider of one or a combination of video services, data services, and phone services via a network or a combination of networks (e.g., the Internet, an intranet, an extranet, local-area networks, wide-area networks, fiber-coax networks, public switched telephone networks, global telephone networks, wired networks, wireless networks, and combinations thereof). The service provider network 126 includes a head end 118, which originates and communicates cable television services and cable modem services to subscribers via networks (e.g., service provider networks 126, edge network 106) owned or operated by the service provider.

According to an aspect, the client 105 is illustrative of an Internet service subscriber and includes a client-side (e.g., local or virtual) customer-premises equipment (CPE) device 116 that creates a local network 102 of computing devices (e.g., client computing device 120, devices 104) at the subscriber/client premises and connects those devices to the service provider network 126 and to other networks 124 along a suitable connection medium as described above. The CPE device 116 may be a single device, such as a combined modem and router unit, or can be comprised of more than one device (e.g., a separate modem and router that are communicatively connected to create the local network 102 and to connect that network to the service provider network 126). The CPE device 116 may include built-in switches that allow for connecting multiple wired devices (e.g., client computing device 120, devices 104), and may also include wireless radios that are configured to connect to wireless (e.g., WI-FI) devices (e.g., client computing device 120, devices 104), and thus create the local network 102. The modem component of the CPE device 116 is configured to transmit digital traffic to and from the connected devices over the connection medium between the client premises and the service provider network 126, thus serving as a bridge between the client's local network 102 and the Internet (other networks 124).

In various implementations, one or more components of the VPSoD system 110 are configured to run on resources at the server-side service provider head end 118. According to aspects, the VPSoD system 110 includes at least one processor and a memory storage device that includes instructions that the processor executes to provide a portal for enabling client users to view available premised server operating systems and services and to select one or more systems and services to operate virtually on the client's local network 102. An aspect of the VPSoD system 110 is configured to generate a user interface (UI 122) for display on a client computing device 120, wherein the UI includes a listing of available premised server host systems and services that can be configured on a virtual premised server 108 communicating on the client's local network 102.

Figure 1B:
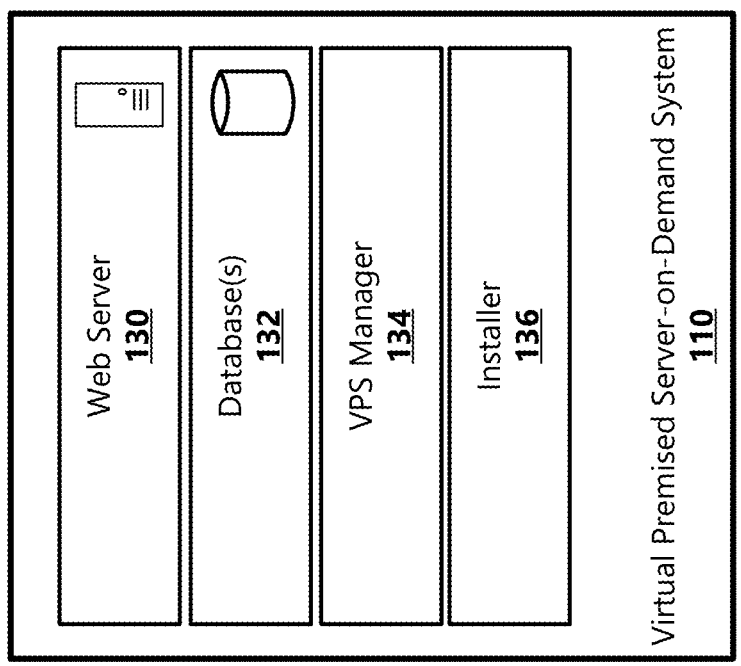
FIG. 1B is a block diagram of example components of a virtual premised server on-demand system.

According to an example, the UI 122 is generated and displayed on a screen of the client computing device 120 in response to a client request for a virtual premised server 108 or for a listing of available premised server services for installation on a virtual premised server. For example, a client user may want to install a premised server (e.g., a home server) on the client user's local network 102, but may not want to or know how to install and configure a premised server, or may not have the physical computing resources for a premised server at the client premises. Accordingly, the client user may wish to use the VPSoD system 110 to install a virtual premised server 108 on an edge network resource 114 that is automatically configured to communicate on the user's local network 102. The client user can use the client computing device 120 to communicate a request to the VPSoD system 110 for available virtual premised services, premised server operating systems (OSs), premised server preconfigured packages (e.g., premised server OS and a package of services), etc., from the VPSoD system 110. Although the client computing device 120 is illustrated as a laptop computer in FIG. 1A, the client computing device may be one of various types of devices that is Internet-enabled and supports a web browser or a client application configured to interface with the VPSoD system 110. According to an aspect and with reference to FIG. 1B, the VPSoD system 110 includes a web server 130 that a user agent 128 (e.g., a web browser, dedicated client application) operating on the client computing device 120 communicates with to request a listing of available virtual premised services for a virtual premised server 108.

Responsive to the request, the VPSoD system 110 is operable to perform a search of its database(s) 132 for available premised server services that can be deployed on a virtual premised server 108. According to an aspect, the database(s) 132 may include various premised server OSs and codebases or source code of various premised server services offered by various third-party developers. The virtual premised server OSs and virtual premised server services may include a combination of open source server platforms and proprietary commercial server platforms. According to examples, codebases offered by third-party developers may be adapted such that the corresponding OS, software system, application, or service can be virtually implemented for the client 105. For example, the virtual premised server services may include various services, applications, software platforms, and the like that provide a variety of functionalities, such as the non-limiting example server functionalities associated with a file server, a network storage/backup server, a download server, a home media server, a web server, an email server, a home automation server (e.g., a home automation hub), a security monitoring server, an online gaming server, and a print server. Other virtual premised server services are possible and are within the scope of the present disclosure. According to an aspect, virtual premised server services can include a variety of services that are configured to run on one or more of the virtual premised server OSs, wherein the one or more of the virtual premised server OSs are configured to be deployed on an edge resource 114 in an edge network 106 in service to Internet Protocol (IP)-enabled devices 104 connected to a client's local network 102. Non-limiting examples of virtual premised server OSs include UBUNTU SERVER developed by CANONICAL, AMAHI HOME SERVER, FREENAS (Network Attached Storage) software, OPENMEDIA-VAULT, WINDOWS HOME SERVER, CLEAROS COMMUNITY EDITION, and CLEAROS PROFESSIONAL EDITION. Other virtual premised server OSs are possible and are within the scope of the present disclosure.

The web server component of the VPSoD system 110 sends the requested information comprising a listing of available virtual premised services for a virtual premised server 108 back to the user agent/client computing device 120, which displays the results on the screen of the client computing device. According to an aspect, the results include a listing of available virtual premised server OSs and/or a listing of available virtual premised server services including details of the features, functionalities and/or networking or other configuration requirements. In various examples, the client user may be unaware of which virtual premised server OS to select. For example, the client user may be a non-technical user and may not know differences between the various virtual premised server OSs and may not know which virtual premised server OS may suit his/her premised server needs. Accordingly, in various implementations, the results include a description of each virtual premised server OS, which may include various features of the OS, supported platforms, included/compatible services or supported plugins, prices, etc. In various implementations, the results include preconfigured packages of a virtual premised server OS and a set of included services, wherein additional services can be added to the preconfigured packages. In other aspects, the results include an executable or script that automatically identifies a virtual premised server OS according to a supported platform, included/compatible services or supported plugins, etc.

In various implementations, a filtering tool 202 is provided in the UI 122. The filtering tool 202 enables the client user to selectively narrow down virtual premised server results and to surface relevant results based on the user's premised server needs. For example, the client user may use the filtering tool 202 to input or select the user's requirements or intentions for a virtual premised server 108, and the filtering tool 202 is operable to recommend the most relevant virtual premised server options to the user. According to an example, the filtering tool 202 may prompt the client user to answer several questions, such as questions about what type of user the client user is (e.g., home, small office, business, or enterprise), types of applications/services the client user would like to run (e.g., file server, file synchronization, data backup, multimedia hub, productivity, host virtual machines, home automation, print, gaming, security), the number of users or devices the client user is planning to connect to the virtual premised server, and other questions that can help with identifying relevant virtual premised server options for the user. The filtering tool 202 may provide various filtering options, such as price options (e.g., free, various price ranges), applications or services that are included with or that are compatible with a virtual premised server OS, supported plugins, functionalities provided by included/compatible services or supported plugins, compatible devices 104 or device platforms (e.g., PCs, MACs, LINUX, MEEGO, IPHONEs, IPADs, ANDROID, GOOGLE TV, PLAYSTATION, XBOX, HDTVS, ROKU, TIVO), keywords mentioned in virtual premised server OS titles or descriptions, etc.

Figure 2A:
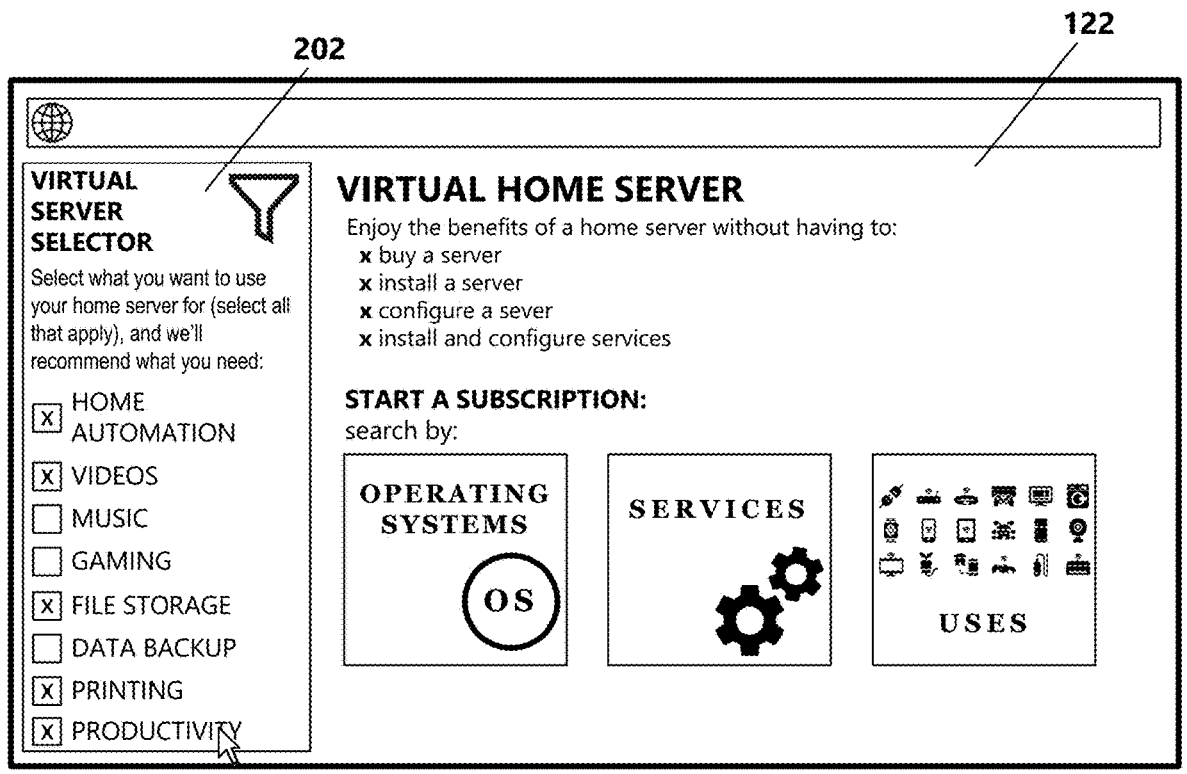
FIG. 2A is an illustration of an example user interface that may be provided by an aspect of the virtual premised server on-demand system for enabling a search of services that can be installed on a virtualized premised server in accordance with an embodiment.

In some implementations, the results include a description of each available virtual premised server service. In some implementations, the filtering tool 202 enables the client user to selectively narrow down virtual premised server services results and to surface relevant services results based on the user's premised server needs. Example filtering options may include price options, functionalities provided by the various services, compatible OSs, keywords mentioned in the virtual premised server services titles or descriptions, etc. For example, a client user is enabled to select one or more uses that the user intends for a virtual premised server, and the filtering tool 202 recommends one or more virtual premised server services that are relevant based on the user's selections. With reference to FIG. 2A, an illustration of an example UI 122 that may be provided by aspects of the VPSoD system 110 is shown. The example UI 122 includes various functionalities for enabling a client user to search for virtual premised services to install on a virtual premised server 108. The example UI 122 includes an illustration of an example filtering tool 202 that a client user can use for being provided with a listing of relevant virtual premised services based on the user's needs. For example, the user may use the filtering tool 202 to indicate a need for a media service, a file sharing service, a home automation hub, and a contact management service. In some examples, the user may be presented with follow-up questions to narrow his/her search. Responsive to the user's selections and additional input (if applicable), the filtering tool 202 may present the user with a list of one or more relevant virtual premised services. For example, the filtering tool 202 may recommend PLEX as a recommended media service, NEXTCLOUD as a recommended file sharing service, HOME ASSISTANT as a recommended home automation hub service, and MONICA as a recommended contact management service. In various examples, relevant virtual premised services may be categorized by virtual premised server OSs that support the services.

Figure 2B:
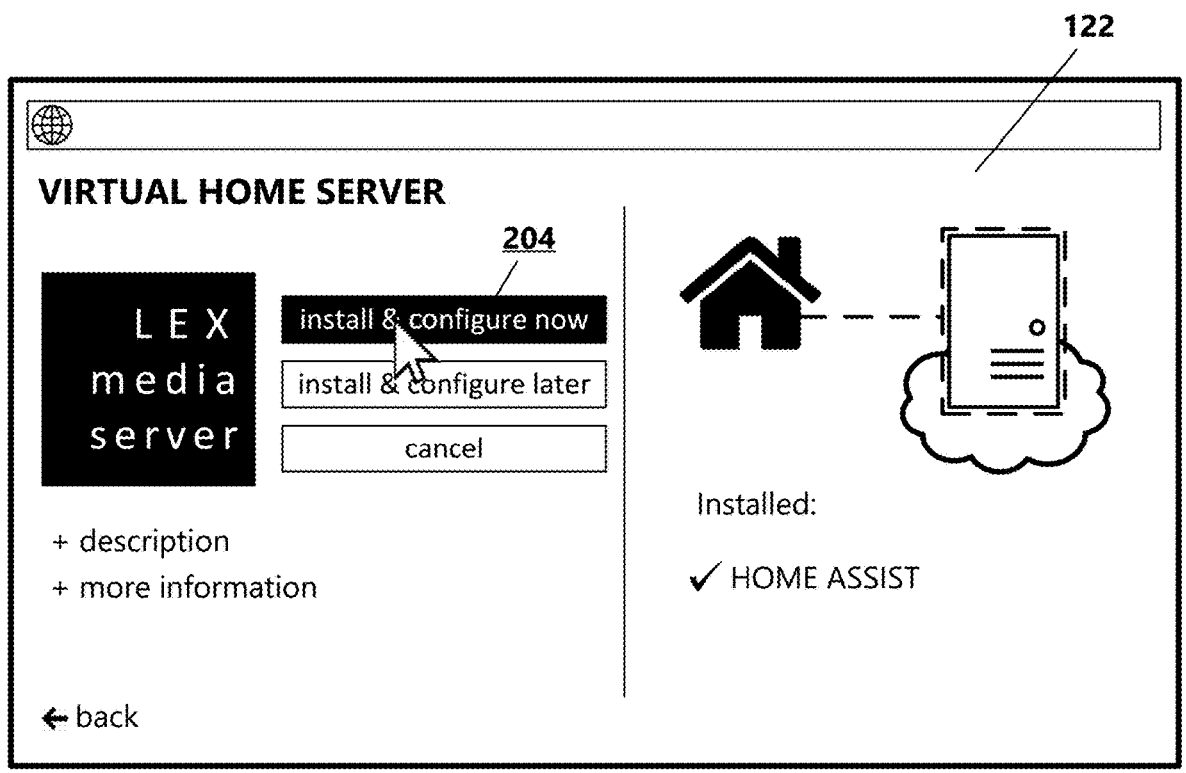
FIG. 2B is an illustration of an example user interface that may be provided by an aspect of the virtual premised server on-demand system for enabling a user to select, install a virtual premised service on demand in accordance with an embodiment.

According to an aspect, the client user is further enabled to select to subscribe to a selected service and to immediately install and configure/set up the selected service on a virtual premised server 108. For example and with reference to FIG. 2B, an example UI 122 is illustrated that shows an example selector 204 that enables a client user to select to install and configure a virtual premised service on demand. Responsive to a selection to install the particular service (e.g., via a selection of a button 204 in the UI 122), the service may be installed on the virtual premised server 108 as part of a VPSoD service.

According to an aspect, the VPSoD service provides an on-demand subscription to the one or more selected virtual premised server OSs and services that are deployed on an edge network resource 114 and automatically configured to communicate on the consumer's local network 102 via a secure communication tunnel 112 (e.g., an L2 network link). According to one aspect, subscribing to a virtual premised server OS and services may involve subscribing to use of the virtual premised server OS and services for a particular price (e.g., a particular price per month, a particular price per year). The client user may pay for a subscription to the VPSoD service with one or more lump-sum payments, or the subscription cost may be added to the client's account with the service provider (e.g., the client user is billed monthly, yearly, etc.).

As described above, a virtual premised server 108 is comprised of a virtual premised server OS and services deployed on an edge resource 114 in an edge network 106 proximate to the client's local network 102. According to an aspect, edge resources 114 are virtual computing environments comprised of configurations of computing resources (e.g., central processing unit (CPU), memory, storage, and bandwidth) hosted by one or more physical resources (e.g., data centers, commercial off-the-shelf (COTS) servers, switches, storage devices, or other cloud computing infrastructure) at an edge (i.e., edge network 106) of a network system (e.g., service provider network 126) that are configurable to host a virtual premised server 108 comprised of at least one virtual premised server OS and configured to run one or more sets of virtual premised server services or microservices.

The client computing device 120 communicates the client user's selections to subscribe to one or more selected virtual premised server OSs and services to the VPSoD system 110, which is configured to receive the selections and generate an on-demand subscription for the client 105 to the VPSoD service. As part of enabling the subscription to the VPSoD service, various back-office processes may be performed, such as updating a subscription database with account information of the client user to the VPSoD service and updating an administrative system, such that the service provider's billing system (e.g., billing system 662), with the client's VPSoD service subscription information.

According to an aspect and with reference again to FIG. 1B, the VPSoD system 110 includes a VPS manager 134 illustrative of a software application, module, or computing device operative or configured to manage virtual premised servers 108. In various examples, the VPS manager 134 includes one or more of: a resource/VW (Virtual Network Function) manager, a virtualized infrastructure manager, and a network function virtualization (NFV) orchestrator. As part of managing virtual premised servers 108, aspects of the VPS manager 134 are configured to perform the operations of setup (e.g., OS and software installations and configurations, maintenance (e.g., updating and/or upgrading virtual premised servers, supporting virtual premised server software changes), and teardown of virtual premised servers. In various examples, a virtual premised server 108 is illustrative of a virtual network function (VNF) (i.e., a software implementation of a premised (home) server).

When the client 105 is subscribed to the VPSoD service, the VPS manager 134 is configured to deploy a virtual premised server 108 on an edge resource 114 in an edge network 106 proximate to the client's local network 102. Further, the VPS manager 134 configures a secure communication tunnel 112, such as a Layer 2 Tunneling Protocol (L2TP) connection between the virtual premised server 108 and the client 105. According to an aspect, tunneling allows the use of the service provider's edge network 106 to convey data on behalf of the client's private network. An L2TP connection comprises a tunnel and a session, wherein the tunnel provides bi-directional data transport between the virtual premised server 108 and the client CPE 116 (and carries control packets), and the session is logically contained within the tunnel and carries user and application data. Accordingly, the communication tunnel 112 between the client's local network 102 and the virtual premised server 108 provides a unified network where the virtual premised server is enabled to behave as though it were locally-connected to the local network.

According to an aspect, via the communication tunnel 112, the virtual premised server 108 is enabled to communicate on the local network 102, and thus communicate with one or more devices 104 connected to the local network. The virtual premised server 108 may communicate with devices 104 connected to the local network 102 as part of discovering devices and as part of providing functionalities of the one more virtual premised server services installed on the virtual premised server. For example, the devices 104 can include a variety of devices and device types, such as but not limited to: computing devices such as personal computers, mobile phones, tablet devices, media devices (e.g., connected televisions, media players), gaming devices, printing devices (e.g., laser printers, ink printers, 3D printers, all-in-one printers), home automation devices (e.g., smart thermostats, smart locks, smart sprinkler systems, smart lights, garage door controllers), home security devices (e.g., cameras, alarms), smart home assistants, Internet of Things (IoT) devices, connected automobiles, etc. According to aspects, the devices 104 are configured to be addressed over Internet Protocol (IP). In various examples, a virtual premised server service operating on a virtual premised server 108 can be used to control machines (devices 104) such as equipment that uses subtractive processes to produce a desired product (e.g., computer numerical control (CNC) mills and lathes).

Figure 2C:
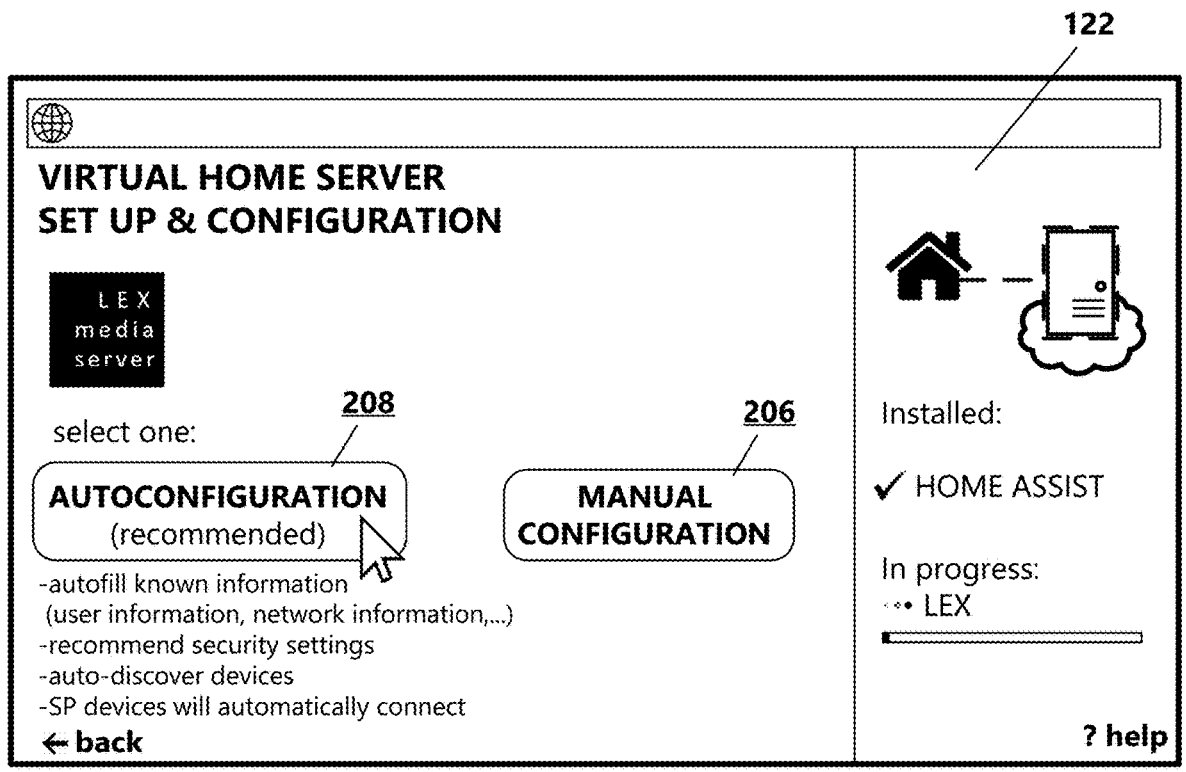
FIG. 2C is an illustration of an example user interface that may be provided by an aspect of the virtual premised server on-demand system for enabling a user to select to automatically configure a virtual premised service in accordance with an embodiment.

In some examples and with reference to FIG. 2C, the UI 122 may be updated to present the client user with an option 206 to manually set up and configure the service and an autoconfiguration option 208 to automatically set up and configure the service with minimal or no input required from the user. For example, selection of the autoconfiguration option 208 enables an aspect of the VPSoD system 110 to automatically fill in known information, such as client user information and client network information. The autoconfiguration option 208 may further recommend/automatically select certain settings, such as security settings. The autoconfiguration option 208 may further automatically discover devices 104 on the client network 102, and present those devices to the user for enabling to select devices to connect to the virtual premised server 108.

In various implementations, the VPSoD system 110 includes an installer 136 component, wherein the installer is illustrative of a software application, module, or computing device operative or configured to automate the configuration process of an installed virtual premised server OS and services with minimal or no user input. The installer 136 may be located at the service provider headend 118, or an instance of the installer 136 may be installed on the virtual premised server 108 when the virtual premised server is deployed. In various examples, the installer 136 acts as an intermediary between the virtual premised server 108 and the client user. For example, the installer 136 can be configured to perform one or more of: loading appropriate firmware, assigning IP and other network specific addresses, loading custom web pages, enabling web-based configurations; pinging or querying attached device(s) 104 over the network 102, etc. In various implementations, the installer 136 is operative to interface a service installed on a virtual premised server 108 to receive requests for needed setup and configuration information, to automatically fill in and respond to those requests based on information known or discovered about the client/network and preset or user-selected autoconfiguration settings, and to prompt the client user for setup and configuration inputs that cannot be automatically completed on behalf of the user. As a service provider of the client 105, the VPSoD system 110 has access to information about the client 105 and the client's local network 102, such as client network configuration information, client user information, device information, service provider services information, etc. In various examples, client information accessed by the installer 136 is stored in one or more databases that are part of a data services system (e.g., data services 626 illustrated in FIG. 6).

Figure 2D:
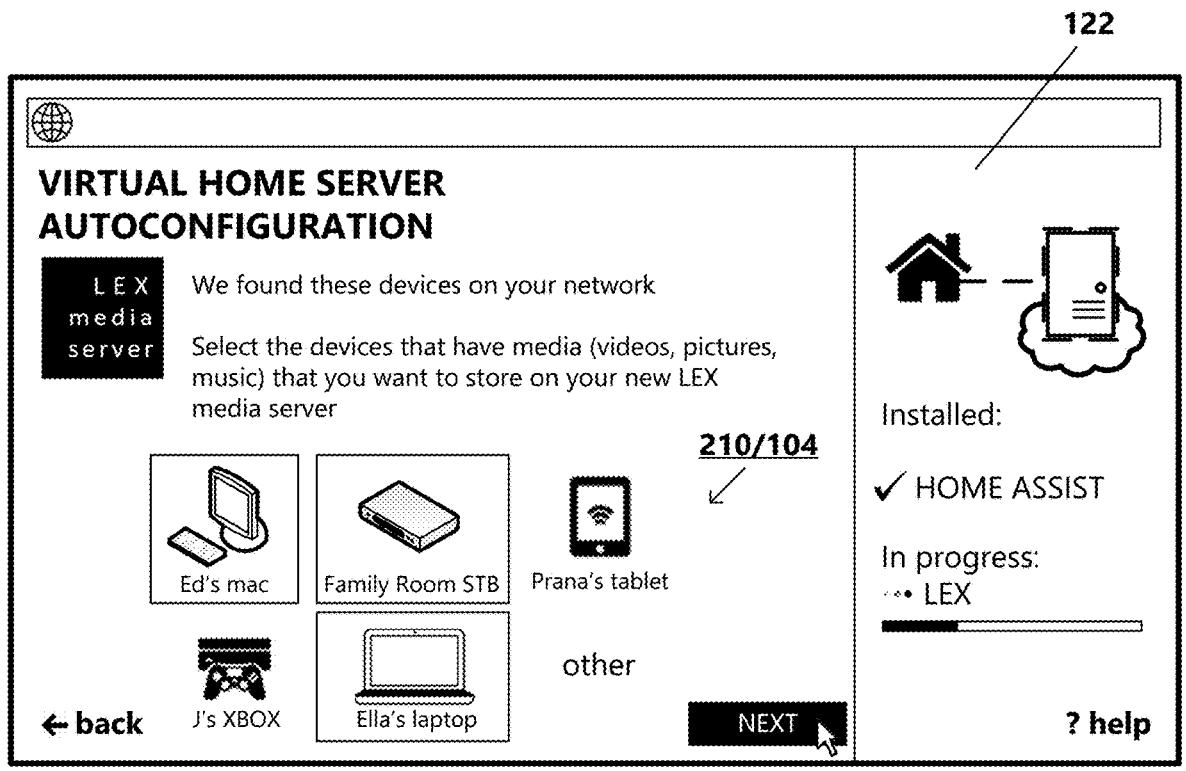
FIG. 2D is an illustration of an example user interface that may be provided by an aspect of the virtual premised server on-demand system for providing a list of discovered devices for enabling a user to selectively add to a virtual premised server in accordance with an embodiment.

According to an aspect, the virtual premised server 108 is configured to use the communication tunnel 112 to communicate with devices 104 connected to the client local network 102. For example, as part of configuring a service to perform a functionality (e.g., configuring a print server service to perform printing functions, configuring a home automation hub to automate devices), devices 104 (e.g., printers, IoT devices) on the local network 102 can be selectively added to the service. As part of the setup and configuration process, the installer 136 may send a ping or query request for device(s) 104 attached to the local network 102, or may instruct the virtual premised server 108 to send a ping request or run a network scanning tool or application. In some examples, a client CPE 116 device is configured as a multi-radio device, and is able to simultaneously transmit/receive data on two or more isolated Wi-Fi channels (e.g., on a 2.4 GHz frequency band and a 5 GHz frequency band). In such cases, the virtual premised server 108 can be configured to scan/ping the two or more isolated channels. According to an aspect and as illustrated in FIG. 2D, results 210 from a ping request or a network scan may include a listing of the devices 104 found on the local network 102, and the results can be included in the UI 122. These results 210 can include such information as IP addresses, MAC addresses, device makes, device models, device types or classes (e.g., printer, switch, firewall, access point, laptop, or phone), device nicknames, etc. The results 210 may be filtered or categorized by device type or device class. In various implementations, results presented to the user are relevant to the premised services being installed/configured. According to an aspect, relevance to a particular premised service may be based on device class (e.g., device setup class), wherein devices that are set up and configured in a same/similar manner are grouped into particular device setup class. For example, when installing/configuring a print server service, the results of the ping request or the network scan can include printer class devices (e.g., printers).

In various implementations, an installed OS or an installed service includes a device installation component, which the installer 136 is configured to interface. For example, the device installation component may be comprised of various components, such as a plug and play (PnP) manager, a setup application programming interface (API), a configuration manager API, a driver store, a device manager, and other components that perform device installation tasks and functions. The driver store may store a plurality of driver packages associated with various types of devices 104, which can be accessed and installed for enabling a virtual premised service installed on the virtual premised server 108 to interoperate with the devices. The driver packages may be preloaded with the premised server OS or service, or the device installer may be configured to access the driver package from a device provider website or other store. In various implementations, the installer 136 is configured to communicate with the device installation component via an API. For example, setup instructions or steps associated with a service (e.g., may be part of a setup application) can be communicated to the installer 136 via the API, and the installer can provide known data and user-input data to the service via the API. Accordingly, the installer 136 simplifies the virtual server/service configuration process and minimizes the number of manual configuration steps or user inputs involved. The installer 136 is further configured to provide the client user with step-by-step instructions associated with any manual configuration steps.

In various examples, selection of the auto-configuration option 208 may enable the installer 136 to, with or without user permissions, automatically install client applications on one or more selected devices 104 to enable interaction with the installed service. For example, responsive to a selection of the auto-configuration option 208 for installation of a particular media server on the virtualized premised server 108, the installer 136 may be configured to automatically install a client application associated with the particular media server on a selected smart television or media player. In various examples, the virtual premised server 108 is configured to broadcast its presence to the local network 102 for enabling one or more devices 104 connected to the network to automatically discover and communicate with the virtual premised server for utilizing functionalities of one or more installed services.

Figure 2E:
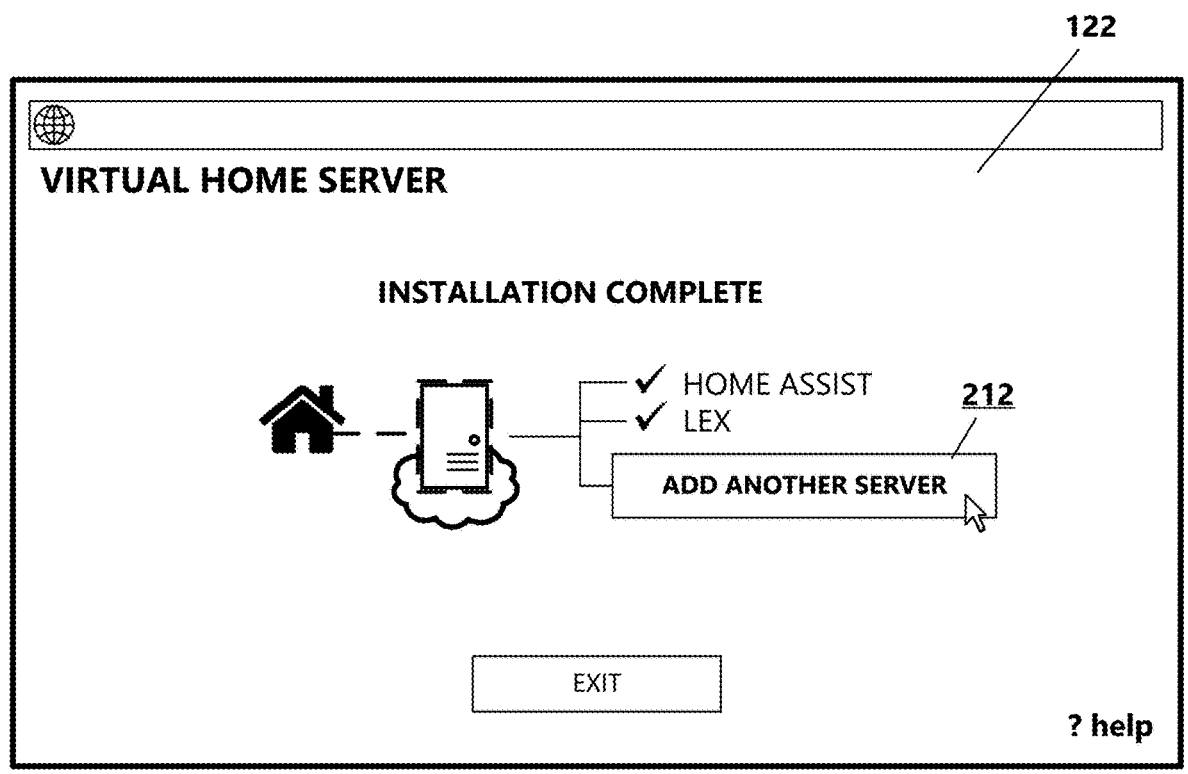
FIG. 2E is an illustration of an example user interface that may be provided by an aspect of the virtual premised server on-demand system that shows a listing of virtual premised services that have been installed and configured on a virtual premised server in accordance with an embodiment.

As illustrated in FIG. 2E, responsive to completing an installation, the UI 122 may be updated to display a listing of installed virtual premised services and to present the user with an option 212 to add additional services or plugins to installed services. When the client 105 is subscribed to the VPSoD service, the VPSoD system 110 provides the client an opportunity to utilize the virtual premised server 108 for various premised (home) server functionalities. In one example, the client user may select to install a home automation service on the virtual premised server. For example, the home automation service may be configured as a home automation hub and utilized to connect to a plurality of home automation devices (devices 104) for creating a home automation network comprised of the home automation service and a plurality of home automation devices. The home automation service may be used to automate and control the various connected devices 104 in communication with the virtual home automation service. For example, the home automation service installed on the virtual premised server 108 may be used to control or automate a variety of IP-enabled devices 104, such as thermostats, lights fixtures, security systems, door locks, televisions, window blinds, sprinkler systems, garage door openers, smart home assistants, speakers, vacuums and video doorbell systems, etc. The virtual home automation service may identify these devices and integrate one or more selected devices into an automation framework. Some automation devices utilize proprietary bridges. Aspects of the VPSoD system 110 enable the configuration of proprietary bridges as part of the automatic installation and configuration of the virtual premised server OS and services.

As another example, the client user may select to install a print server service on the virtual premised server 108, where the print server service may be configured to receive a print file from a client device, process the print file, and send the print file to a printer (device 104) connected to the network. As an example, the client user may select to install a virtual print server service for offloading 3D print computations and 3D printer controls from the user's personal computing device in order to free up the device's processing resources. For a 3D print operation, the print service may process a print file by slicing the 3D print file and creating a printer command code file that the printer uses. Depending on the complexity of a print project or on the type of printer, printing a 3D object with a 3D printer can tie up processing resources for hours or even days. With a virtual print server service operating on the virtual premised server 108, the 3D print processing can be offloaded from the user's local computing device, and a 3D print can completed without the presence of the user's device on the network 102.

As another example, the client user may select to install a media service on the virtual premised server 108, wherein the media service may be configured to store a plurality of media files, receive a selection of a media file from the plurality of media files from a device 104, and stream the selected media file for playback on the device.

As another example, the client user may select to install a generic type of virtual premised server 108, such as an x86-64-based server OS on which one or more services can be selectively installed for providing one or more service functionalities to one or more devices 104 connected to the client's local network 102. A generic virtual premised server 108 may enable a client user to employ a generic server environment that can be customized to the user's server needs.

Figure 3:
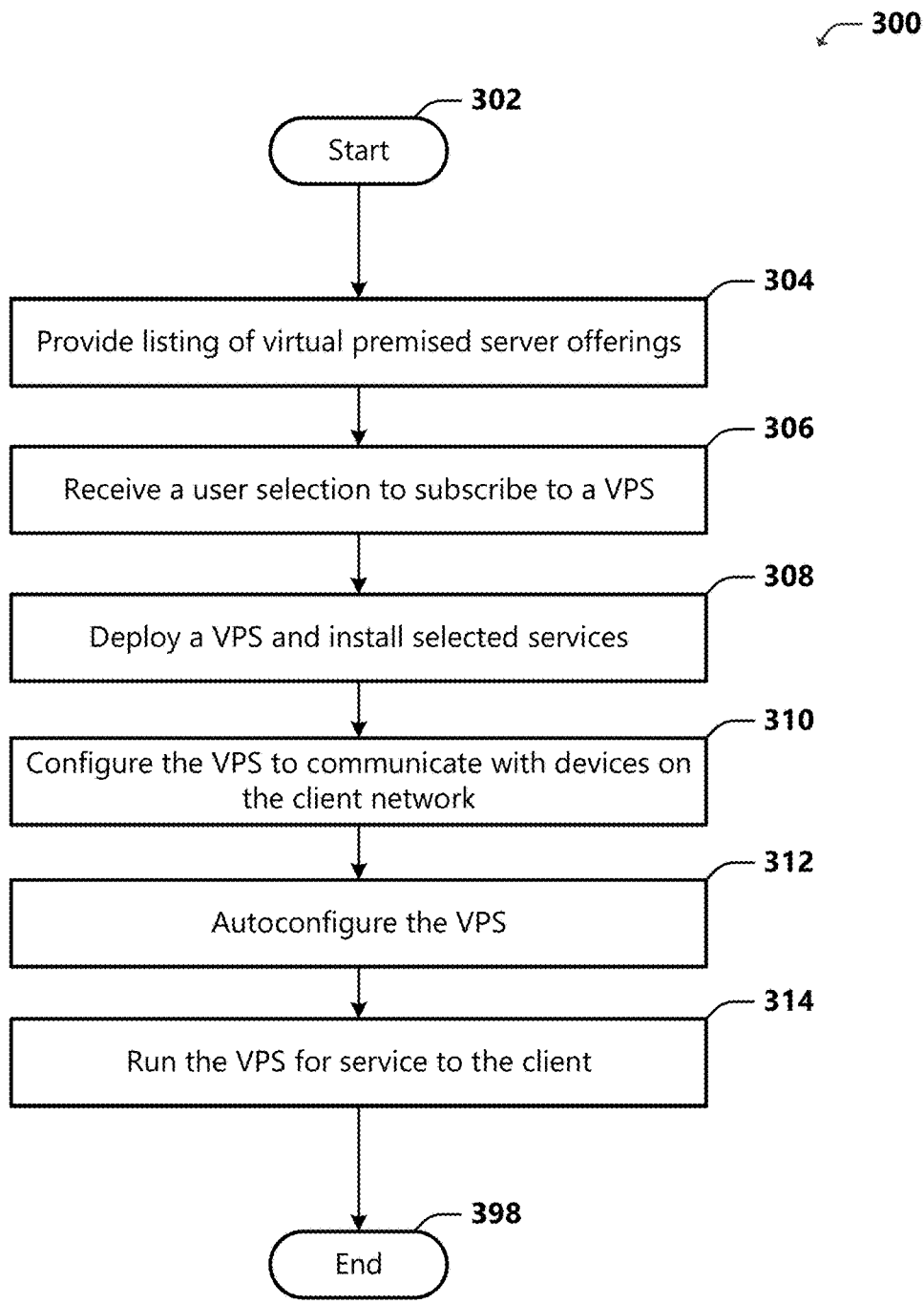
FIG. 3 is a flow diagram depicting general stages of an example process for providing automated premised server installation and support in accordance with an embodiment in accordance with an embodiment.

FIG. 3 is a flow diagram depicting general stages of an example method 300 for providing automated premised server installation and support in accordance with an embodiment. The method 300 starts at OPERATION 302 and proceeds to OPERATION 304, where a request is received by the VPSoD system 110 for a listing of available premised server offerings. For example, a client user may use a user agent 128 executing on a client computing device 120 to communicate with a web server 130 component of the VPSoD system 110. The client user may access the VPSoD system 110 to view available virtual premised server offerings and to subscribe to the VPSoD service, where a virtual premised server 108 is installed on a network resource and is configured for the user based on the user's premised server needs. According to examples, the client user may be presented with a UI 122 generated and provided by the VPSoD system 110 that includes a listing of virtual premised server offerings, which may be comprised of various virtual premised server OS options, virtual premised server services options, prepackaged offerings of particular virtual premised server OSs and selected services, and the like. The UI 122 may further include a filtering tool 202 that is operable to receive user input corresponding to the user's premised server needs (e.g., the client user's intended uses for the virtual premised server) and to provide a listing of relevant virtual premised server options (e.g., OSs, services, compute/memory resources) from which the user is enabled to select.

At OPERATION 306, the method uses the web server 130 to receive a client user selection to subscribe to the VPSoD service. For example, the client user is enabled to use the UI 122 to select one or more premised server services and other subscription options (e.g., subscription duration, payment) to subscribe to the VPSoD service, and the user's selections are communicated to the VPSoD system web server 130. Responsive to receiving the client user selection of a virtual premised service and to subscribe to the VPSoD service, the method 300 proceeds to OPERATION 308, where the VPSoD system 110 uses the VPS manager 134 to create an instance of a virtual premised server 108 (e.g., a VNF) based on the user's selections and to deploy the virtual server on an edge resource 114 in an edge network 106 proximate to the client 105. At OPERATION 308, various back-office processes may be performed, such as updating a subscription database with account information of the client user to the VPSoD service and updating an administrative system such that the service provider's billing system is updated with the client's VPSoD service subscription information.

At OPERATION 310, the method 300 uses the VPS manager 134 to configure a secure communication tunnel 112 (e.g., L2TP connection) between the deployed virtual premised server 108 and the client 105, thus providing a unified network where the virtual premised server is enabled to behave as though it were locally-connected to the local network 102.

At OPERATION 312, the method 300 uses the installer 136 to automatically configure the installed service. The virtual premised server 108 is configured to use the communication tunnel 112 to communicate on the local network 102. For example, the virtual premised server 108 is operable communicate over the communication tunnel 112 and send a ping request or run a network scanning tool or application to discover devices 104 on the local network 102. The discovered devices 104 may be displayed to the client user, and the user may be enabled to select which devices to pair with the virtual premised server 108. In some implementations, the devices that are displayed to the user are devices of a specific device-type that are relevant to the virtual premised server 108 or to services that are installed on the virtual premised server. Upon receiving a user selection of one or more devices 104 to connect with the virtual premised server 108, device drivers of the one or more devices are automatically installed. One or more user-involved configuration steps may be involved for enabling certain services to function as the user intends. For example, the client user may create various rules to control certain devices 104.

At OPERATION 314, the virtual premised server 108 runs on the edge network resource 114 and communicates on the client's local network 102 for providing various service functionalities to the client 105. The method 300 ends at OPERATION 398.

Figure 4:
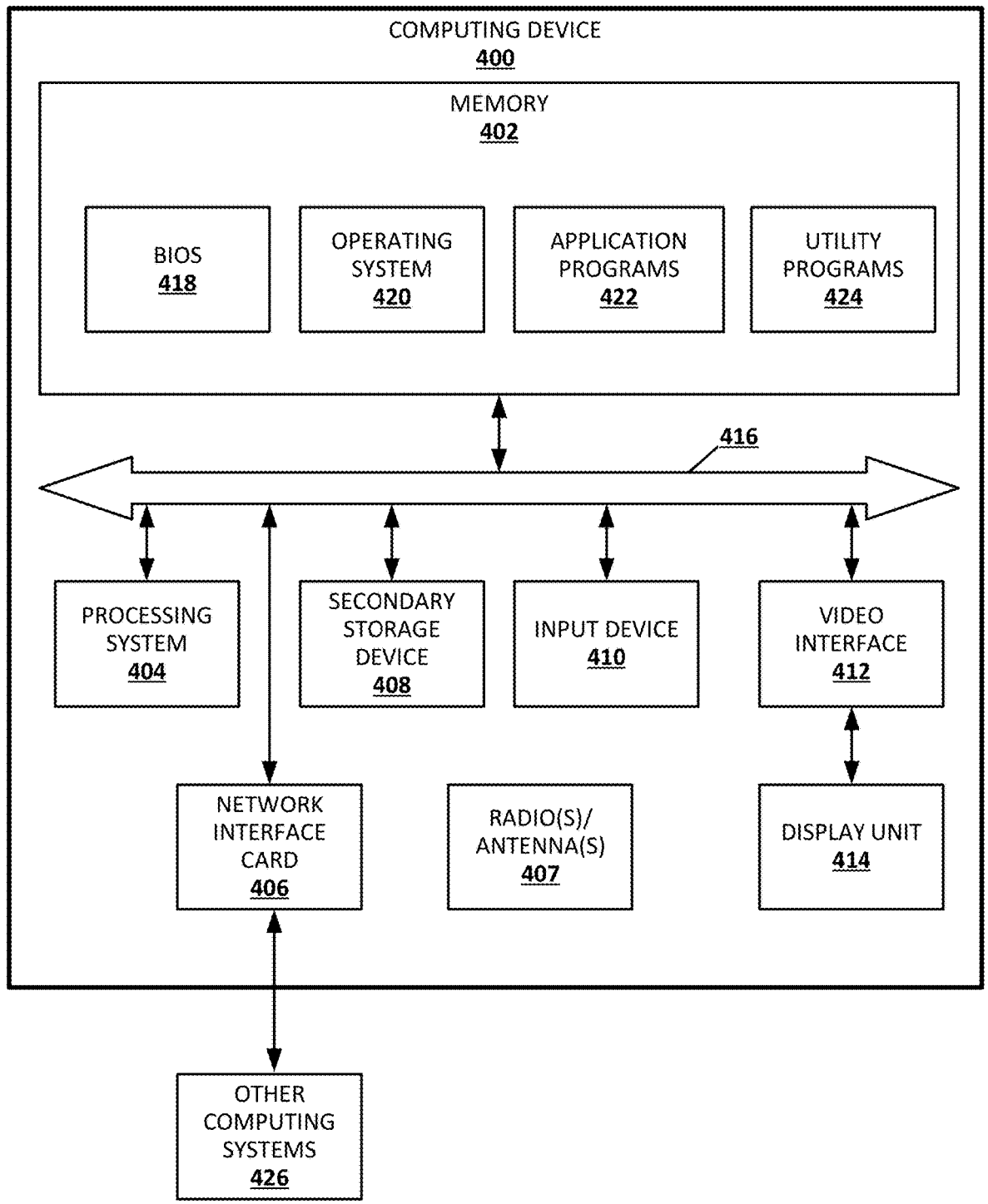
FIG. 4 is a block diagram illustrating example physical components of a computing device or system with which embodiments may be practiced.

FIG. 4 is a block diagram illustrating example physical components of a computing device or system 400 with which embodiments may be practiced. It should be appreciated that in other embodiments, different hardware components other than those illustrated in the example of FIG. 4 may be used. Computing devices may be implemented in different ways in different embodiments. For instance, in the example of FIG. 4, the computing device 400 includes a processing system 404, memory 402, a network interface 406 (wired and/or wireless), radio/antenna 407, a secondary storage device 408, an input device 410, a video interface 412, a display unit 414, and a communication medium 416. In other embodiments, the computing device 400 may be implemented using more or fewer hardware components (e.g., a video interface, a display unit, or an input device) or in combination with other types of computer systems and program modules 426.

The memory 402 includes one or more computer-readable storage media capable of storing data and/or computer-executable instructions. Memory 402 may store the computer-executable instructions that, when executed by processor 404, provide automated virtual premised server installation and services configuration. For example, the memory 402 may include sufficient computer-executable instructions for the VPSoD system 110, which when executed, perform functionalities as described herein.

In various embodiments, the memory 402 is implemented in various ways. For example, the memory 402 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 404 includes one or more processing units, which may include tangible integrated circuits that selectively execute computer-executable instructions. In various embodiments, the processing units in the processing system 404 are implemented in various ways. For example, the processing units in the processing system 404 can be implemented as one or more processing cores. In this example, the processing system 404 can comprise one or more microprocessors. In another example, the processing system 404 can comprise one or more separate microprocessors. In yet another example embodiment, the processing system 404 can comprise Application-Specific Integrated Circuits (ASICs) that provide specific functionality. In yet another example, the processing system 404 provides specific functionality by using an ASIC and by executing computer-executable instructions.

The computing device 400 may be enabled to send data to and receive data from a communication network via a network interface card 406. In different embodiments, the network interface card 406 is implemented in different ways, such as an Ethernet interface, a token-ring network interface, a fiber optic network interface, a wireless network interface (e.g., WI-FI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 408 includes one or more computer-readable storage media, and may store data and computer-executable instructions not directly accessible by the processing system 404. That is, the processing system 404 performs an I/O operation to retrieve data and/or computer-executable instructions from the secondary storage device 408. In various embodiments, the secondary storage device 408 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 410 enables the computing device 400 to receive input from a user. Example types of input devices include, but are not limited to, keyboards, mice, trackballs, stylus input devices, key pads, microphones, joysticks, touch-sensitive display screens, and other types of devices that provide user input to the computing device 400.

The video interface 412 outputs video information to the display unit 414. In different embodiments, the video interface 412 is implemented in different ways. For example, the video interface 412 is a video expansion card. In another example, the video interface 412 is integrated into a motherboard of the computing device 400. In various embodiments, the display unit 414 can be an LCD display panel, a touch-sensitive display panel, an LED screen, a projector, a cathode-ray tube display, or another type of display unit. In various embodiments, the video interface 412 communicates with the display unit 414 in various ways. For example, the video interface 412 can communicate with the display unit 414 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 416 facilitates communication among the hardware components of the computing device 400. In different embodiments, the communications medium 416 facilitates communication among different components of the computing device 400. For instance, in the example of FIG. 4, the communications medium 416 facilitates communication among the memory 402, the processing system 404, the network interface card 406, the secondary storage device 408, the input device 410, and the video interface 412. In different embodiments, the communications medium 416 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 402 stores various types of data and/or software instructions. For instance, in the example of FIG. 4, the memory 402 stores a Basic Input/Output System (BIOS) 418, and an operating system 420. The BIOS 418 includes a set of software instructions that, when executed by the processing system 404, cause the computing device 400 to boot up. The operating system 420 includes a set of software instructions that, when executed by the processing system 404, cause the computing device 400 to provide an operating system that coordinates the activities and sharing of resources of the computing device 400. The memory 402 also stores one or more application programs or program code 422 that, when executed by the processing system 404, cause the computing device 400 to provide applications to users. The memory 402 also stores one or more utility programs 424 that, when executed by the processing system 404, cause the computing device 400 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), etc. including any combination thereof.

Figures 5A, 5B:
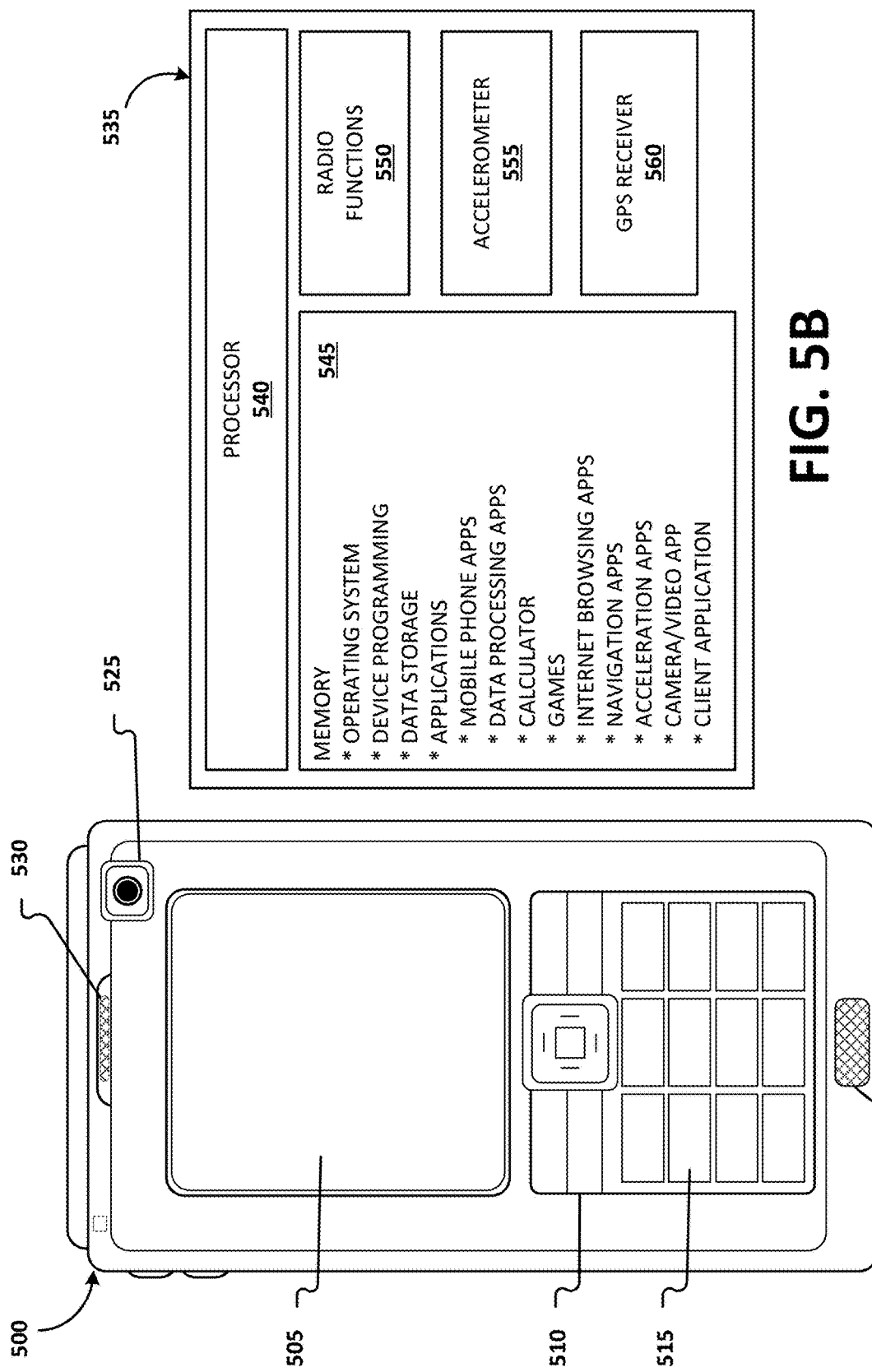
FIGS. 5A and 5B are block diagrams illustrating example physical components of a suitable mobile computing environment with which aspects of the present disclosure can be practiced.

FIGS. 5A-5B illustrate a suitable mobile computing device 500 or environment, for example, a mobile computing device or smart phone, a tablet personal computer, a laptop computer, or other user device, with which aspects can be practiced. The mobile computing device 500 is illustrative of any suitable device operative to send, receive and process wireless communications. A display screen 505 is operative for displaying a variety of information such as information about incoming and outgoing communications, as well as, a variety of data and displayable objects, for example, text, alphanumeric data, photographs, and the like including a user interface to communicate with the CPE device 116.

Data input to the mobile computing device 500 can be performed via a variety of suitable means, such as, touch screen input via the display screen 505, keyboard or keypad input via a data entry area 510, key input via one or more selectable buttons or controls 515, voice input via a microphone 518 disposed on the mobile computing device 500, photographic input via a camera 525 functionality associated with the mobile computing device 500, or any other suitable input means. Data can be output via the mobile computing device 500 via any suitable output means, including but not limited to, display on the display screen 505, audible output via an associated speaker 530 or connected earphone system, vibration module for providing tactile output, and the like.

Referring now to FIG. 5B, operational unit 535 is illustrative of internal operating functionality of the mobile computing device 500. A processor 540 is illustrative of a computer processor for processing incoming and outgoing data and communications and controlling operation of the device and associated software applications via a mobile computing device operating system. Memory 545 can be utilized for storing a device operating system, device programming, one or more stored applications, for example, mobile telephone applications, data processing applications, calculators, games, Internet browsing applications, navigation applications, acceleration applications, camera and/or video applications, etc.

Mobile computing device 500 can contain an accelerometer 555 for detecting acceleration, and can be used to sense orientation, vibration, and/or shock. Mobile computing device 500 can contain a global positioning system (GPS) system (e.g., GPS send/receive functionality) 560. A GPS system 560 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 550 include all required functionality, including onboard antennae, for allowing the mobile computing device 500 to communicate with other communication devices and systems via a wireless network. Radio functions 550 can be utilized to communicate with a wireless or WIFI-based positioning system to determine a device location.

Figure 6:
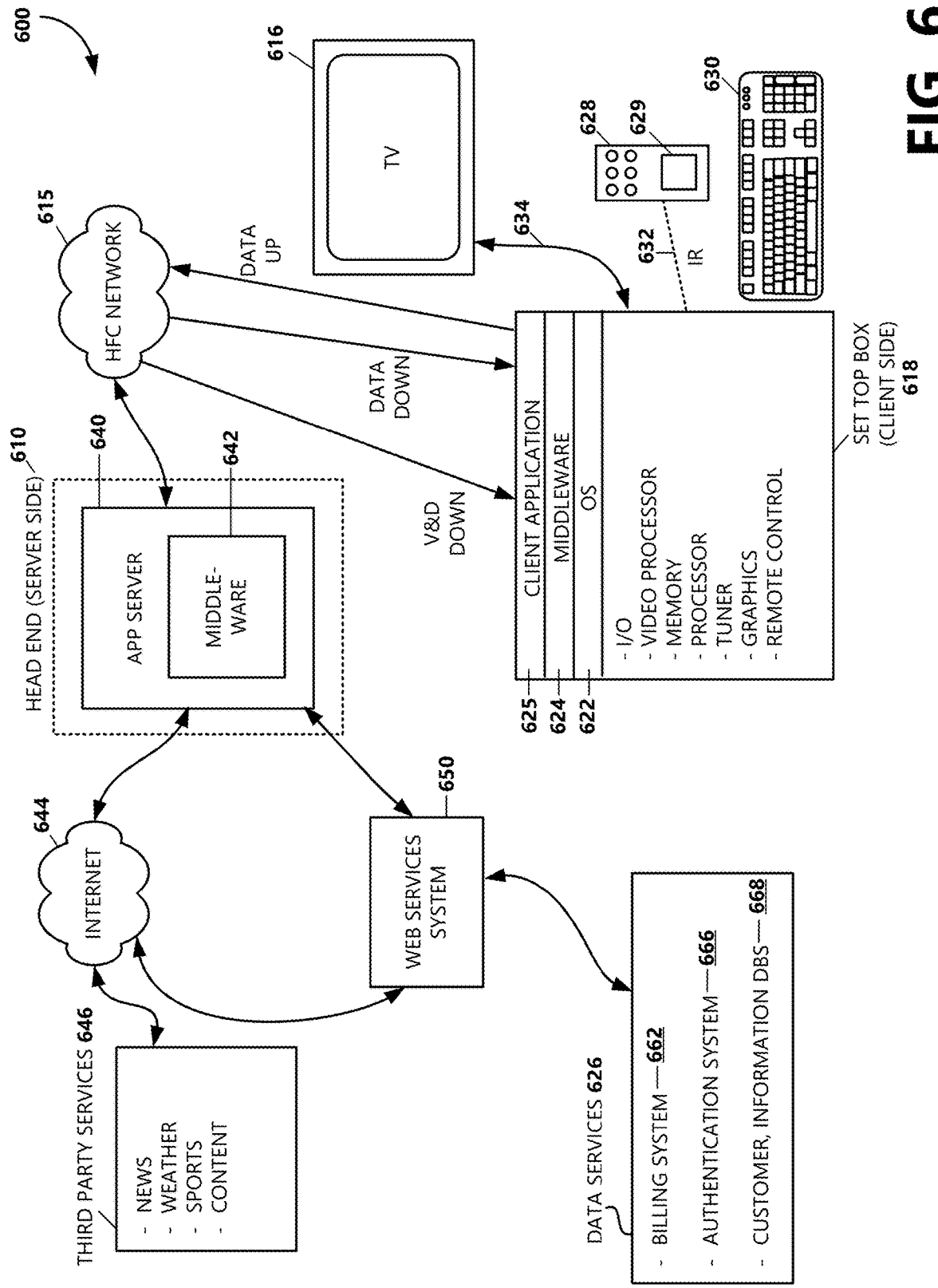
FIG. 6 is a block diagram illustrating components of a cable services system architecture providing an example operating environment according to aspects of the present disclosure.

FIG. 6 is a block diagram illustrating a cable television services system 600 (hereafter referred to as "CATV") architecture providing an operating environment according to an aspect. Referring now to FIG. 6, digital and analog video programming, information content, and interactive television services are provided via a hybrid fiber coax (HFC) network 615 to a television set 616 for consumption by a cable television/services system customer. As is known to those skilled in the art, HFC networks 615 combine both optical fiber and coaxial cable lines. Typically, optical fiber runs from the cable head end 610 to neighborhoods of subscribers. Coaxial cable runs from the optical fiber feeders to each customer or subscriber. The functionality of the HFC network 615 allows for efficient bidirectional data flow between the set-top box 618 and the application server 640 of the aspect.

The CATV system 600 is in the form of a distributed client-server computing system for providing video and data flow across the HFC network 615 between server-side services providers (e.g., cable television/services providers) via a server-side head end 610 and a client-side customer via a set-top box (STB) 618 functionally connected to a customer receiving device, such as the television set 616. As is understood by those skilled in the art, modern CATV systems 600 can provide a variety of services across the HFC network 615 including traditional digital and analog video programming, telephone services, high speed Internet access, video-on-demand, and other services.

On the client side of the CATV system 600, digital and analog video programming and digital and analog data are provided to the customer television set 616 via the STB 618. Interactive television services that allow a customer to input data to the CATV system 600 likewise are provided by the STB 618. As illustrated in FIG. 6, the STB 618 is a multipurpose computing device having a computer processor, memory, and an input/output mechanism. The input/output mechanism receives input from server-side processes via the HFC network 615 and from customers via input devices such as a remote control device 628, keyboard 630, or other computing device, such as a tablet/slate computer, smart phone, etc. The remote control device 628 and the keyboard 630 can communicate with the STB 618 via a suitable communication transport such as the infrared connection 632. The remote control device 628 can include a biometric input module 629. The STB 618 also includes a video processor for processing and providing digital and analog video signaling to the television set 616 via a cable communication transport 634. A multi-channel tuner is provided for processing video and data to and from the STB 618 and the server-side head end system 610, described below.

The STB 618 also includes an operating system 622 for directing the functions of the STB 618 in conjunction with a variety of client applications 625. For example, if a client application 625 requires a news flash from a third-party news source to be displayed on the television 616, the operating system 622 can cause the graphics functionality and video processor of the STB 618, for example, to output the news flash to the television 616 at the direction of the client application 625 responsible for displaying news items.

Because a variety of different operating systems 622 can be utilized by a variety of different brands and types of set-top boxes 618, a middleware layer 624 can be provided to allow a given software application to be executed by a variety of different operating systems. According to an embodiment, the middleware layer 624 can include a set of application programming interfaces (APIs) that are exposed to client applications and operating systems 622 that allow client applications 625 to communicate with the operating systems 622 through common data calls understood via the API set. As described below, a corresponding middleware layer 642 is included on the server side of the CATV system 600 for facilitating communication between the server-side application server and the client-side STB 618. The middleware layer 642 of the server-side application server and the middleware layer 624 of the client-side STB 618 can format data passed between the client side and server side according to the Extensible Markup Language (XML).

According to one aspect, the STB 618 passes digital and analog video and data signaling to the television 616 via a one-way communication transport 634. According to other aspects, two-way communication transports can be utilized, for example, via high definition multimedia (HDMI) ports. The STB 618 can receive video and data from the server side of the CATV system 600 via the HFC network 615 through a video/data downlink and data via a data downlink. The STB 618 can transmit data from the client side of the CATV system 600 to the server side of the CATV system 600 via the HFC network 615 via one data uplink. The video/data downlink is an "in band" downlink that allows for digital and analog video and data signaling from the server side of the CATV system 600 through the HFC network 615 to the STB 618 for use by the STB 618 and for distribution to the television set 616. As is understood by those skilled in the art, the "in band" signaling space operates at a relative high frequency, e.g., between 54 and 1000 megahertz. The signaling space is generally divided into 6 megahertz channels in which can be transmitted as a single analog signal or a greater number (e.g., ten) of digital signals.

The data downlink and the data uplink, illustrated in FIG. 6, between the HFC network 615 and the set-top box 618 comprise "out of band" data links. As is understand by those skilled in the art, the "out of band" frequency range is generally at a lower frequency than "in band" signaling. For example, the "out of band" frequency range can be between zero and 54 megahertz. Data flow between the STB 618 and the server-side application server 640 is typically passed through the "out of band" data links. Alternatively, an "in band" data carousel can be positioned in an "in band" channel into which a data feed can be processed from the application server 640 through the HFC network 615 to the STB 618. Operation of data transport between components of the CATV system 600, described with reference to FIG. 6, is well known to those skilled in the art.

Referring still to FIG. 6, the head end 610 of the CATV system 600 is positioned on the server side of the CATV system and includes hardware and software systems responsible for originating and managing content for distributing through the HFC network 615 to client-side STBs 618 for presentation to customers. As described above, a number of services can be provided by the CATV system 600, including digital and analog video programming, interactive television services, telephone services, video-on-demand services, targeted advertising, and/or provision of supplemental content.

The application server 640 can be configured as a computing system operative to assemble and manage data sent to and received from the STB 618 via the HFC network 615. As described above, the application server 640 includes a middleware layer 642 for processing and preparing data from the head end 610 of the CATV system 600 for receipt and use by the client-side STB 618. For example, the application server 640 via the middleware layer 642 can obtain supplemental content from third-party services 646 via the Internet 644 for transmitting to a customer through the HFC network 615, the STB 618, and recording by a local or remote DVR. For example, content metadata from a third-party content provider service can be downloaded by the application server 640 via the Internet 644. When the application server 640 receives the downloaded content metadata, the middleware layer 642 can be utilized to format the content metadata for receipt and use by the STB 618. Therefore, content metadata can be sent and categorized based on the availability to the customer's program guide data.

According to one embodiment, data obtained and managed by the middleware layer 642 of the application server 640 is formatted according to the Extensible Markup Language and is passed to the STB 618 through the HFC network 615 where the XML-formatted data can be utilized by a client application 625 in concert with the middleware layer 624, as described above. As should be appreciated by those skilled in the art, a variety of third-party services data 646, including news data, weather data, sports data and other information content can be obtained by the application server 640 via distributed computing environments such as the Internet 644 for provision to customers via the HFC network 615 and the STB 618.

According to aspects, the application server 640 obtains customer support services data, including billing data, information on customer work order status, answers to frequently asked questions, services provider contact information, and the like from data services 626 for provision to the customer via an interactive television session. The data services 626 include a number of services operated by the services provider of the CATV system 600 which can include profile and other data associated with a given customer.

A billing system 662 can include information such as a customer's name, street address, business identification number, Social Security number, credit history, and information regarding services and products subscribed to by the customer. According to embodiments, the billing system 662 can also include billing data for services and products subscribed to by the customer for bill processing, billing presentment and payment receipt.

A customer information database 668 can include general information about customers such as place of employment, business address, business telephone number, and demographic information such as age, gender, educational level, and the like. The customer information database 668 can also include information on pending work orders for services or products ordered by the customer. The customer information database 668 can also include general customer information such as answers to frequently asked customer questions and contact information for various service provider offices/departments. As should be understood, this information can be stored in a variety of disparate databases operated by the cable services provider.

Referring still to FIG. 6, web services system 650 is illustrated between the application server 640 and the data services 626. According to aspects, web services system 650 serves as a collection point for data requested from each of the disparate data services systems comprising the data services 626. According to aspects, when the application server 640 requires customer services data from one or more of the data services 626, the application server 640 passes a data query to the web services system 650. The web services system 650 formulates a data query to each of the available data services systems for obtaining any required data for a requesting customer as identified by a set-top box identification associated with the customer.

The web services system 650 serves as an abstraction layer between the various data services systems and the application server 640. That is, the application server 640 is not required to communicate with the disparate data services systems, nor is the application server 640 required to understand the data structures or data types utilized by the disparate data services systems. The web services system 650 is operative to communicate with each of the disparate data services systems for obtaining necessary customer data. The customer data obtained by the web services system is assembled and is returned to the application server 640 for ultimate processing via the middleware layer 642, as described above. An authentication system 666 can include information such as secure user names, subscriber profiles, subscriber IDs, and passwords utilized by customers for access to network services. As should be understood by those skilled in the art, the disparate systems 650, 662, 666, 668 can be integrated or provided in any combination of separate systems, wherein FIG. 6 shows only one example.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:

1. A method for providing automated virtual premised server installation, the method comprising:
   receiving a request from a client for a listing of available virtual premised services configured to be deployed on a virtualized instance of a virtual premised server in communication with a local network of the client;
   providing the listing of found available virtual premised services, and descriptions of those services, to the client for display, wherein functionalities of the found services are configured to be performed by a virtualized instance of a premised server;
   responsive to receiving a client selection of a service, instantiating the virtual premised server on a network resource in an edge network proximate to the local network of the client;
   installing the selected service on the instantiated virtual premised server; and automatically configuring a communication tunnel between the instantiated virtual premised server and the local network for enabling the instantiated virtual premised server to communicate on the local network to provide one or more functionalities of the installed service to one or more devices connected to the local network.

2. The method of claim 1, further comprising using an installer to automatically set up and configure the installed service by:
filling in network and device configuration information based on information known about the client;
scanning the local network for devices connected to the local network;
generating a listing of discovered network-connected devices;
receiving a selection of a discovered network-connected device from the listing to register the selected device with the virtual premised server; and
accessing and installing a driver associated with the selected device on the virtual premised server to enable the installed service to interoperate with the selected device for providing the functionality of the installed service.

3. The method of claim 2, wherein:
receiving the selection of the service comprises receiving a selection of a home automation hub;
receiving the selection of the discovered network-connected device comprises receiving a selection of an Internet Protocol-enabled device; and
installing the driver associated with the selected device comprises installing a driver on the virtual premised server to enable the instantiated premised server to interoperate with the selected device as part of providing home automation functionalities of the installed home automation hub.

4. The method of claim 2, wherein:
receiving the selection of the service comprises receiving a selection of a print service;
receiving the selection of the discovered network-connected device comprises receiving a selection of a print device; and
installing the driver associated with the selected device comprises installing a driver associated with the selected print device on the virtual premised server to enable the virtual premised server to interoperate with the selected print device as part of providing print functionalities of the selected print service.

5. The method of claim 2, wherein:
receiving the selection of the service comprises receiving a selection of a media storage and streaming service;
receiving the selection of the discovered network-connected device comprises receiving a selection of a media playback device; and
installing the driver associated with the selected device comprises installing a driver associated with the selected media playback device on the virtual premised server to enable the virtual premised server to interoperate with the selected media playback device as part of providing media storage and streaming functionalities of the selected media storage and streaming service.

6. The method of claim 1, further comprising:
receiving a selection to install a second service of the found services;
responsive to receiving the selection, installing the second service on the virtual premised server; and
automatically setting up and configuring the second service.

7. A system for providing automated virtual premised server installation, the system comprising:
at least one processor;
a memory storage device including instructions that when executed by the at least one processor are configured to:
receive a request from a client for a listing of available virtual premised services that are configurable on a virtual premised server in communication with a local network of the client;
in response to the received request, search for available virtual premised services that are deployable on the virtual premised server;
send a list of found available virtual premised services, and descriptions of those services, to the client for display, wherein functionalities of the found services are configured to be performed by a virtualized instance of a premised server;
receive a selection from the client to install one of the found services;
responsive to the client selection, instantiate the virtual premised server on a network resource proximate to the local network of the client in support of the selected service;
install the selected service on the instantiated virtual premised server; and
automatically configure a communication tunnel between the instantiated virtual premised server and the local network for enabling the instantiated virtual premised server to communicate on the local network to provide one or more functionalities of the installed service to one or more devices connected to the local network.

8. The system of claim 7, wherein the system provides the virtual premised server access to client information, including:
client network configuration information;
client user information;
device information; and
service provider services information.

9. The system of claim 8, wherein the system is further configured to:
scan the local network for devices connected to the local network;
generate a listing of discovered network-connected devices;
receive a selection of a discovered network-connected device from the listing; and
register the selected device with the installed service.

10. The system of claim 9, wherein the system is further configured to access and install a driver associated with the selected device on the virtual premised server to enable the installed service to interoperate with the selected device.

11. The system of claim 9, wherein:
the installed service is a home automation hub;
the selected device is a device located at a premises of the local network that is configured to be addressed over Internet Protocol; and
the virtual premised server is configured to interoperate with the selected device as part of providing home automation functionalities of the home automation hub.

12. The system of claim 9, wherein:
the installed service is a print service;
the selected device is a print device; and the virtual premised server is configured to interoperate with the selected print device as part of providing print functionalities of the installed print service.

13. The system of claim 9, wherein:
the installed service is a media storage and streaming service;
the selected device is a media playback device; and
the virtual premised server is configured to interoperate with the selected media playback device as part of providing media storage and streaming functionalities of the installed media storage and streaming service.

14. The system of claim 7, wherein the network resource is an edge network resource in an edge network proximate to the local network.

15. The system of claim 7, wherein the selection from the client to install one of the found services is an indication of a selection to subscribe to a virtual premised server on-demand subscription service, wherein the virtual premised server on-demand subscription service enables the client to selectively install one or more premised server services on an edge network resource in an edge network proximate to the local network.

16. The system of claim 7, wherein in configuring the communication tunnel between the virtual premised server and the local network, the system is configured to utilize layer-2 (L2) tunneling protocol to create a secure connection between a customer premises equipment device and the virtual premised server.

17. The system of claim 7, wherein the system is further configured to:
receive a selection to install a second service of the found services;
responsive to the selection, install the second service on the virtual premised server; and
automatically set up and configure the second service.

18. The system of claim 17, wherein in automatically setting up and configuring the second service, the system is configured to:
autofill client network-related configuration information;
scan the local network for devices connected to the local network;
generate a listing of discovered network-connected devices;
receive a selection of a discovered network-connected device from the listing; and
register the selected device with the second service.

19. A computer readable storage device that includes executable instructions which, when executed by a processor:
provide a portal for enabling a client to selectively subscribe to a virtual premised server on-demand service;
provide to the client, via the portal, a listing of virtual premised server services, and descriptions of those services, that are available for installation on a virtual premised server as part of the virtual premised server on-demand service;
receive, from a device connected to local area network of the client, a selection of a service from the listing and an indication of a request to install the selected service on the virtual premised server;
responsive to the request:
instantiate the virtual premised server on an edge resource in an edge network proximate to the local area network of the client;
install the selected service on the instantiated virtual premised server; and
automatically configure a tunneling protocol tunnel between the instantiated virtual premised server and the local area network for enabling the instantiated virtual premised server to communicate on the local area network to provide one or more functionalities of the installed service to one or more devices connected to the local area network.

20. The computer readable storage device of claim 19, wherein the executable instructions, when executed by a processor, are further configured to provide an installer operable to automatically set up and configure the installed service, wherein the installer is configured to:
autofill known network and client device setup and configuration information;
scan the local area network for devices connected to the local area network;
collect information about each discovered network-connected device;
for each discovered network-connected device, based on the collected information, determine whether the discovered network-connected device is compatible with the premised server service;
generate a listing of discovered network-connected devices determined to be compatible with the premised server service;
receive a user-selection of a discovered network-connected device from the listing to register the selected device with the virtual premised server; and
install a driver associated with the selected device on the virtual premised server to enable the virtual premised server to interoperate with the selected device for providing the functionalities of the premised server service.

* * * * *